(12) United States Patent
Abe et al.

(10) Patent No.: US 7,905,308 B2
(45) Date of Patent: Mar. 15, 2011

(54) VEHICLE BATTERY COOLING DEVICE

(75) Inventors: Naoyuki Abe, Saitama (JP); Hiroto Kobayashi, Saitama (JP); Koichi Yamamoto, Saitama (JP); Tsukasa Ohkawa, Saitama (JP); Kosuke Tachikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 195 days.

(21) Appl. No.: 12/269,410

(22) Filed: Nov. 12, 2008

(65) Prior Publication Data

US 2009/0120620 A1 May 14, 2009

(30) Foreign Application Priority Data

Nov. 12, 2007 (JP) ................................. 2007-293738
Nov. 12, 2007 (JP) ................................. 2007-293740

(51) Int. Cl.
*B60R 16/04* (2006.01)

(52) U.S. Cl. ...................................................... 180/68.5

(58) Field of Classification Search ................. 180/65.1, 180/65.3, 68.5, 65.31; 429/62, 120, 153; 903/907
See application file for complete search history.

(56) References Cited

U.S. PATENT DOCUMENTS

| | | | |
|---|---|---|---|
| 5,501,289 A * | 3/1996 | Nishikawa et al. | 180/68.5 |
| 6,085,854 A * | 7/2000 | Nishikawa | 180/68.5 |
| 7,079,379 B2 * | 7/2006 | Yamaguchi et al. | 361/676 |
| 7,688,582 B2 * | 3/2010 | Fukazu et al. | 361/690 |
| 2002/0102457 A1 * | 8/2002 | Oogami et al. | 429/159 |
| 2007/0024244 A1 * | 2/2007 | Zhu et al. | 320/150 |
| 2007/0072061 A1 * | 3/2007 | Shimizu | 429/62 |
| 2008/0003495 A1 * | 1/2008 | Shimizu | 429/99 |
| 2008/0164081 A1 * | 7/2008 | Watanabe et al. | 180/65.2 |

FOREIGN PATENT DOCUMENTS

| | | |
|---|---|---|
| JP | 5-193376 | 8/1993 |
| JP | 8-140282 | 5/1996 |
| JP | 8-244473 | 9/1996 |
| JP | 2000-41303 | 2/2000 |
| JP | 2001-105894 | 4/2001 |
| JP | 2002-50412 | 2/2002 |
| JP | 3640846 B | 4/2005 |
| JP | 2006-74869 | 3/2006 |
| JP | 2009-54303 | 3/2009 |
| JP | 2009-87583 | 4/2009 |

OTHER PUBLICATIONS

Japanese Office Action for Application No. 2007-293738, dated Aug. 10, 2009.
Japanese Office Action for Application No. 2007-293740, dated Aug. 10, 2009.

* cited by examiner

*Primary Examiner* — Frank B Vanaman
(74) *Attorney, Agent, or Firm* — Nelson Mullins Riley & Scarborough LLP; Anthony A. Laurentano

(57) ABSTRACT

A vehicle battery cooling device, which includes: a battery case for housing a plurality of batteries to be mounted on a vehicle; a fan for circulating air for cooling the batteries by suctioning air in the battery case; an air inlet disposed on each of a pair of side wall portions facing each other for introducing air from outside the battery case; and an air outlet disposed on a bottom wall portion of the battery case for exhausting air from the battery case by suctioning of the fan.

3 Claims, 14 Drawing Sheets

Cross sectional view taken along A-A line (Front)

Cross sectional view taken along B-B line (Rear)

VEHICLE BATTERY COOLING DEVICE

CROSS REFERENCE TO RELATED APPLICATIONS

This application claims the foreign priority benefit under Title 35, United States Code, §119(a)-(d) of Japanese Patent Application No. 2007-293738, filed on Nov. 12, 2007 and Japanese Patent Application No. 2007-293740, filed on Nov. 12, 2007, the contents of which are hereby incorporated by reference.

BACKGROUND OF THE INVENTION

1. Field of the Invention

The present invention relates to a vehicle battery cooling device.

2. Description of Related Art

In a fuel cell electric vehicle or a hybrid vehicle, a high voltage battery device which discharges a charged electric power or charges a regenerative electric power is mounted for assisting a fuel cell when the vehicle is, for example, accelerated. The high voltage battery device houses a plurality of batteries consist of a secondary battery such as a lithium-ion battery in a battery case and is mounted on a vehicle such as the fuel cell electric vehicle.

When a plurality of the batteries are charged or discharged, a temperature of the batteries increases, and as a result, a performance of the batteries is degraded. Therefore, for preventing the performance of the batteries from degrading, a vehicle battery cooling device which cools the batteries by circulating air using a fan has been proposed (see Japanese Patent No. 3640846).

It is, therefore, another object of the present invention to provide a vehicle battery cooling device which can effectively cool the batteries.

SUMMARY OF THE INVENTION

To solve the issues described above, according to a first aspect of the present invention, there is provided a vehicle battery cooling device which includes: a battery case for housing a plurality of batteries to be mounted on a vehicle; a fan for circulating air for cooling the batteries by suctioning air in the battery case; an air inlet disposed on each of a pair of side wall portions facing each other for introducing air from outside the battery case; and an air outlet disposed on a bottom wall portion of the battery case for exhausting air from the battery case by suctioning of the fan.

In the vehicle battery cooling device described above, when the fan is operated, an air inside the battery case is exhausted outside the battery case by the suctioning of the fan through the air outlet disposed in the bottom wall portion. Therefore, air outside the battery case is introduced into the battery case through the air inlet disposed in each of the pair of facing side wall portions of the battery case, and cools the batteries by being circulated inside the battery case.

As described above, since the fan is disposed in the downstream of the air outlet of the battery case, the batteries can be cooled effectively, compared with a feature that the fan is disposed in the upstream of the battery case and thereby an air raised in temperature by receiving an operation heat of the fan is introduced into the battery case.

In addition, since the air taken into the battery case is introduced through the facing air inlets, a plurality of batteries housed in the battery case can be effectively cooled.

In addition, even if the vehicle battery cooling device is submerged and water floods into the battery case and space, the water can be exhausted rapidly by operating the fan with positive rotation.

According to a second aspect of the present invention depending from the first aspect, there is provided a vehicle battery cooling device which includes: an air introduction duct for introducing air from outside through one air introduction port and guiding the air to each of the air inlets by branching the air, wherein the one air introduction port is disposed distant from an external heat source.

In the vehicle battery cooling device described above, after outside air is introduced through the one air introduction port of the air introduction duct, the air can be branched and guided to each of the air inlets. In addition, since the one air introduction port is disposed distant from the external heat source, the air to be introduced into the battery case is hardly heated up by the external heat source. With the above configuration, the plurality of the batteries can be effectively cooled.

According to a third aspect of the present invention depending from the first aspect or the second aspect, there is provided a vehicle battery cooling device which includes: two first frames extending in a front-rear direction of the vehicle; at least two second frames extending in a vehicle-width direction of the vehicle and to be connected to the two first frames; and a lower plate for sealing a lower side of a space surrounded by the two first frames and the at least two second frames, wherein the battery case is disposed above the space, and air inside the battery case is suctioned by the fan through the air outlet and the space when the fan is operated.

In the vehicle battery cooling device described above, when the fan is operated, air inside the battery case is sequentially suctioned by the fan through the air outlet disposed in the bottom wall portion of the battery case and the space surrounded by the two first frames and the at least two second frames in this order.

That is, in the lower portion of the battery case, the space formed by being surrounded by the two first frames and the at least two second frames as well as sealed by the lower plate can be utilized as an air exhaust path of air discharged from the battery case. Namely, it is unnecessary to dispose a duct which forms the air exhaust path at the air outlets of the battery case. With the configuration described above, a number of components of the vehicle battery cooling device can be reduced and the structure of the vehicle battery cooling device can be simplified, thereby resulting in weight saving of the vehicle battery cooling device.

According to the present invention, a vehicle battery cooling device capable of effectively cooling the batteries can be provided.

According to a fourth aspect of the present invention depending from the third aspect or the second aspect, there is provided a vehicle battery cooling device, wherein the battery case is disposed shifted to one side of the two first frames in the vehicle-width direction, and the fan is disposed on an area above the space produced by shifting the battery case in the vehicle-width direction.

In the vehicle battery cooling device described above, since the battery case is disposed above the space and shifted to one side of the two first frames in the vehicle-width direction, and since the fan is disposed on an area substantially above the space produced by shifting the battery case in the vehicle-width direction, an outer shape of the vehicle battery cooling device has no largely protruding portion and has a compact size, thereby resulting in a small-foot print, that is, in high volumetric efficiency.

Accordingly, the vehicle battery cooling device can be easily mounted on the vehicle where the space is limited.

According to a fifth aspect of the present invention depending from the third aspect, there is provided a vehicle battery cooling device which further includes: a communication hole disposed in the lower plate for communicating between the space and outside, wherein the communication hole is disposed at a position opposite to the fan across the air outlet in the vehicle-width direction.

In the vehicle battery cooling device described above, since the communication hole for communicating between the space and outside (outside of vehicle) is disposed in the lower plate, for example, even if a dew condensation water is produced inside the battery case or the space, the dew condensation water can be discharged outside from the communication hole.

In addition, since the communication hole is disposed at the position opposite to the fan across the air outlet of the battery case, a volume of outside air introduced into the space through the communication hole becomes small when the fan is operated. That is, when the fan is operated for suctioning air inside the battery case, the suctioning loss can be reduced.

According to the present invention, a vehicle battery cooling device which is simple and has a small footprint can be provided.

According to a sixth aspect of the present invention depending from the first aspect, there is provided a vehicle battery cooling device which further includes: a pillar member for connecting an upper wall portion and a bottom wall portion of the battery case; and an air outlet disposed in the upper wall portion and/or bottom wall portion in the vicinity of the pillar member for exhausting air inside the battery case, wherein the batteries have a circular columnar shape and the plurality of the batteries are symmetrically arranged on both sides of the pillar member at a predetermined interval in each layer of the batteries and alternately arranged between the adjacent layers of the batteries in plan view of the battery case; and wherein a first dummy portion having a semicircular columnar shape is disposed on the pillar member, corresponding to a concave portion of each of the battery groups on a side of the air outlet as a dummy of the battery.

In the vehicle battery cooling device described above, air introduced into the battery case from the outside through the air inlet, which is disposed on each of the pair of facing side wall portions, flows among the batteries arranged at the predetermined interval in each layer of the batteries and arranged alternately between the adjacent layers of the batteries in plan view of the battery case, and cools the plurality of the batteries. Then, the air flows toward the air outlets formed in the upper wall portion and/or bottom wall portion in the vicinity of the pillar member, and is exhausted outside from the air outlets.

In addition, since the first dummy portion having a semicircular columnar shape is disposed on the pillar member, corresponding to the concave portion of each of the battery groups on the side of the air outlet as a dummy of the battery, a space which has the semicircular columnar shape is not disposed on the side of the air outlet of each of the battery groups. Therefore, air toward the air outlets from each of the battery groups is not preferentially flown into the space described before.

That is, the air toward the air outlets from each of the battery groups also flows along an outer periphery of each of the batteries on the side of the air outlet of each of the battery groups. Accordingly, the batteries arranged on the side of air outlet of each of the battery groups also can be effectively cooled.

According to a seventh aspect of the present invention depending from the sixth aspect, there is provided a vehicle battery cooling device, wherein the air inlet is disposed corresponding to a protruding battery toward a side of the air inlet of each of the battery groups; and air from the air inlet is introduced toward the protruding battery.

In the vehicle battery cooling device described above, air introduced into the battery case from outside through the air inlet, which is disposed on each of the pair of facing side wall portions, flows among the batteries which are arranged at the predetermined interval in each layer of the batteries and arranged alternately between the adjacent layers of the batteries in plan view of the battery case, and cools the plurality of the batteries. Then, the air flows toward the air outlets formed in the upper wall portion and/or bottom wall portion in the vicinity of the pillar member, and is exhausted outside from the air outlets.

In addition, since the air inlet is formed corresponding to the protruding battery protruding toward the air inlet of each of the battery groups and since air from the air inlet is introduced toward the protruding battery, the introduced air flows along an outer periphery of the protruding battery protruding toward the air inlet, thereby resulting in efficient cooling of the protruding battery.

According to an eighth aspect of the present invention depending from the sixth aspect or seventh aspect, there is provided a vehicle battery cooling device, wherein a second dummy portion having a semicircular columnar shape is disposed at a position between adjacent batteries on an inner surface of at least one of the upper wall portion and the bottom wall portion of the battery case as a dummy of the battery.

In the vehicle battery cooling device described above, since the second dummy portion having the semicircular columnar shape is provided at the position between the adjacent batteries on the inner surface of at least one of the upper wall portion and the bottom wall portion of the battery case as the dummy of the battery, the air flows along the outer periphery of the battery arranged at least one side of the upper wall portion and bottom wall portion of the battery case. Therefore, the battery arranged at least one side of the upper wall portion and bottom wall portion of the battery case also can be cooled effectively.

According to the present invention, a vehicle battery cooling device capable of effective cooling of the battery can be provided.

According to a ninth aspect of the present invention depending from the first aspect, there is provided a vehicle battery cooling device which further includes: temperature detection mean for detecting a temperature of the battery; and control means for controlling the fan based on the temperature of the battery detected by the temperature detection mean, wherein a flow path of air inside the battery case is divided into a plurality of air flow paths; wherein the plurality of batteries are divided into battery groups which are composed of equal number and same arrangement, as well as disposed in each of the air flow paths, respectively; and wherein a flow rate of air flowing inside of at least one of the air flow paths is designed to be less than the flow rate of the other air flow paths, wherein the temperature detection means is set in a battery composing a battery group disposed in the at least one of the air flow paths.

In the vehicle battery cooling device described above, since the flow rate of the air flowing inside of the at least one of the plurality of the divided air flow paths is designed to be less than the flow rate of the other air flow paths, a temperature of the battery composing the battery group disposed in the at least one of the air flow paths is less decreased, compared with the temperature of the batteries composing the other battery groups disposed in the other air flow paths, thereby resulting in increase in temperature.

In addition, the control means controls the fan based on a battery temperature detected by the temperature detection means, which is set in the battery whose temperature is to be increased most, to circulate air in the battery case, thereby resulting in effective cooling of the plurality of the batteries.

That is, in the vehicle battery cooling device described above, since a battery which is less cooled and to be raised to a high temperature can be prepared, a number of temperature detection means can be reduced. Accordingly, a structure of the vehicle battery cooling device can be simplified.

According to a tenth aspect of the present invention depending from the ninth aspect, there is provided a vehicle battery cooling device, wherein a flow resistance of air toward the at lest one of the air flow paths is larger than the flow resistance of air toward the other air flow paths.

Here, the flow resistance of air toward the air flow path means a pressure loss of the air toward the air flow path.

In the vehicle battery cooling device described above, since a flow resistance of air flowing toward at least one air flow path is larger than the flow resistances of the air flowing toward the other air flow paths, the air flows less into the at least one air flow path.

Therefore, the batteries composing the battery group disposed in the at least one air flow path are less cooled, and thereby the temperature of the batteries can be set higher than that of the batteries disposed in the other air flow paths.

According to a twelfth aspect of the present invention depending from the ninth aspect or tenth aspect, there is provided a vehicle battery cooling device, wherein a flow resistance of air exhausted from the at lest one of the air flow paths is larger than the flow resistance of air exhausted from the other air flow paths.

Here, the flow resistance of air exhausted from the air flow path means a pressure loss of the air exhausted from the air flow path.

In the vehicle battery cooling device described above, since a flow resistance of air exhausted from the at least one air flow path is larger than the flow resistances of the air exhausted from the other air flow paths, a volume of air exhausted from the at least one air flow path becomes less.

Therefore, the batteries composing the battery group disposed in the at least one air flow path are less cooled, and thereby the temperature of the batteries can be set higher than that of the batteries disposed in the other air flow paths.

According to the present invention, a vehicle battery cooling device capable of reducing a number of the temperature detection means can be provided.

DETAILED DESCRIPTION OF THE PREFERRED EMBODIMENT

Figure 1:
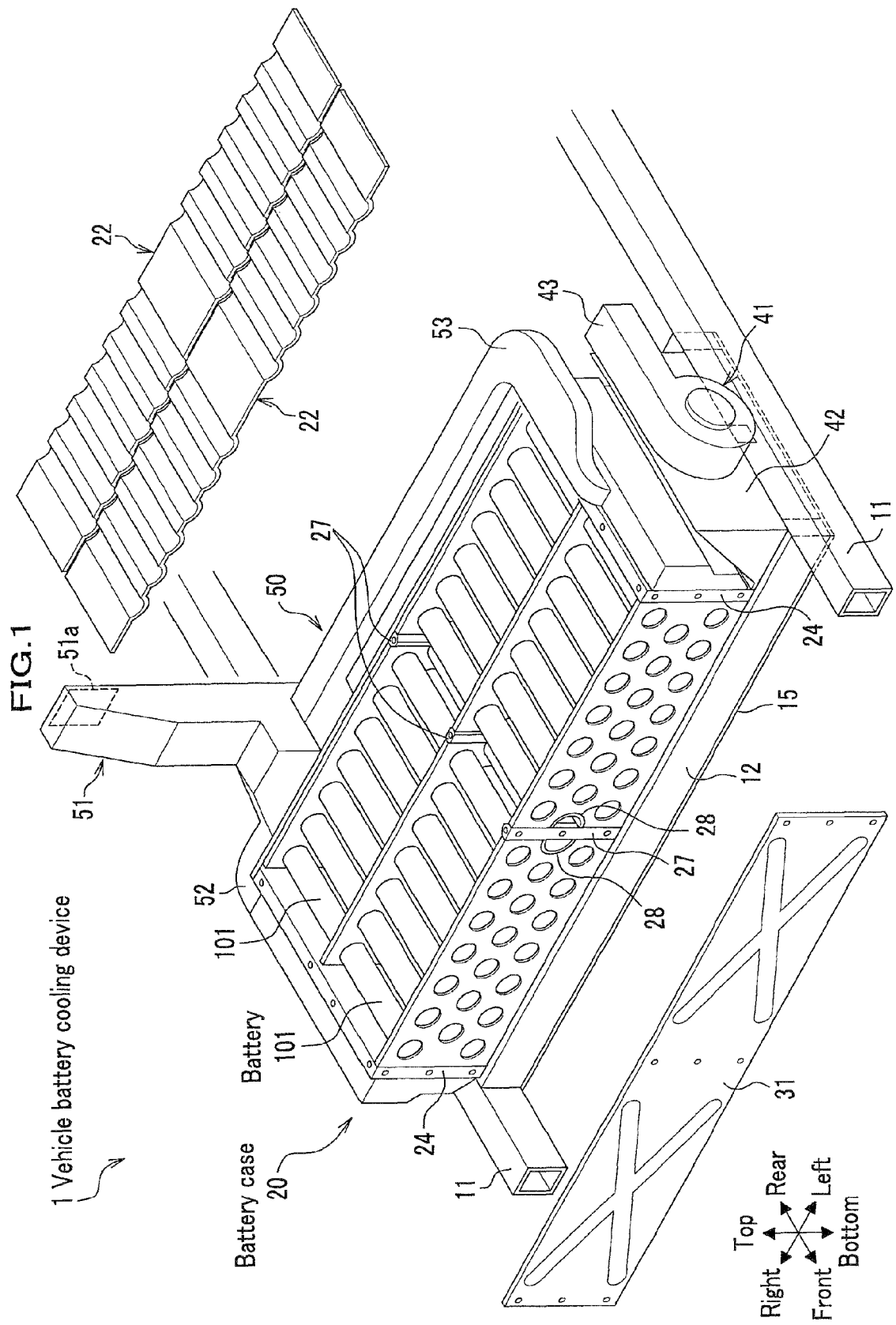
FIG. 1 is a perspective view of a vehicle battery cooling device according to an embodiment of the present invention.

Hereinafter, one embodiment of the present invention will be explained by referring to FIG. 1 to FIG. 16.

A vehicle battery cooling device 1 according to the embodiment is mounted on a fuel cell electric vehicle (vehicle), which is not shown, and disposed beneath a rear sheet of the vehicle. A plurality of batteries 101, which are cooling targets, will be explained in advance before explaining about the vehicle battery cooling device 1.

<<Plurality of Batteries>>

A plurality of the batteries 101 are a secondary battery to discharge a charged electric power or to charge a regenerative electric power for assisting a fuel cell stack (not shown) mounted on a fuel cell electric vehicle. The batteries 101 described above are composed of a secondary battery, for example, a lithium-ion type battery. An outer shape of the battery is a columnar shape, and a longitudinal direction (axis direction) of the battery is aligned along a front-rear direction of the fuel cell electric vehicle. The batteries 101 are connected electrically in series through terminals, which are not shown. A number of the batteries 101 is determined based on a rated output of an electric traction motor (not shown) to be mounted on the fuel cell electric vehicle.

The plurality of the batteries 101 are divided into a first battery group 111, a second battery group 112, a third battery group 113, and a fourth battery group 114 corresponding to four flow paths P1 to P4 (see FIG. 8, FIG. 9) in a battery case 20, described later.

The flow paths P1 to P4 are flow paths, in which air for cooling the plurality of the batteries 101 flows, in the battery case 20, and which are formed such that air flows in the battery case 20 is divided into four by a holding panel 21 described later.

Figure 8:
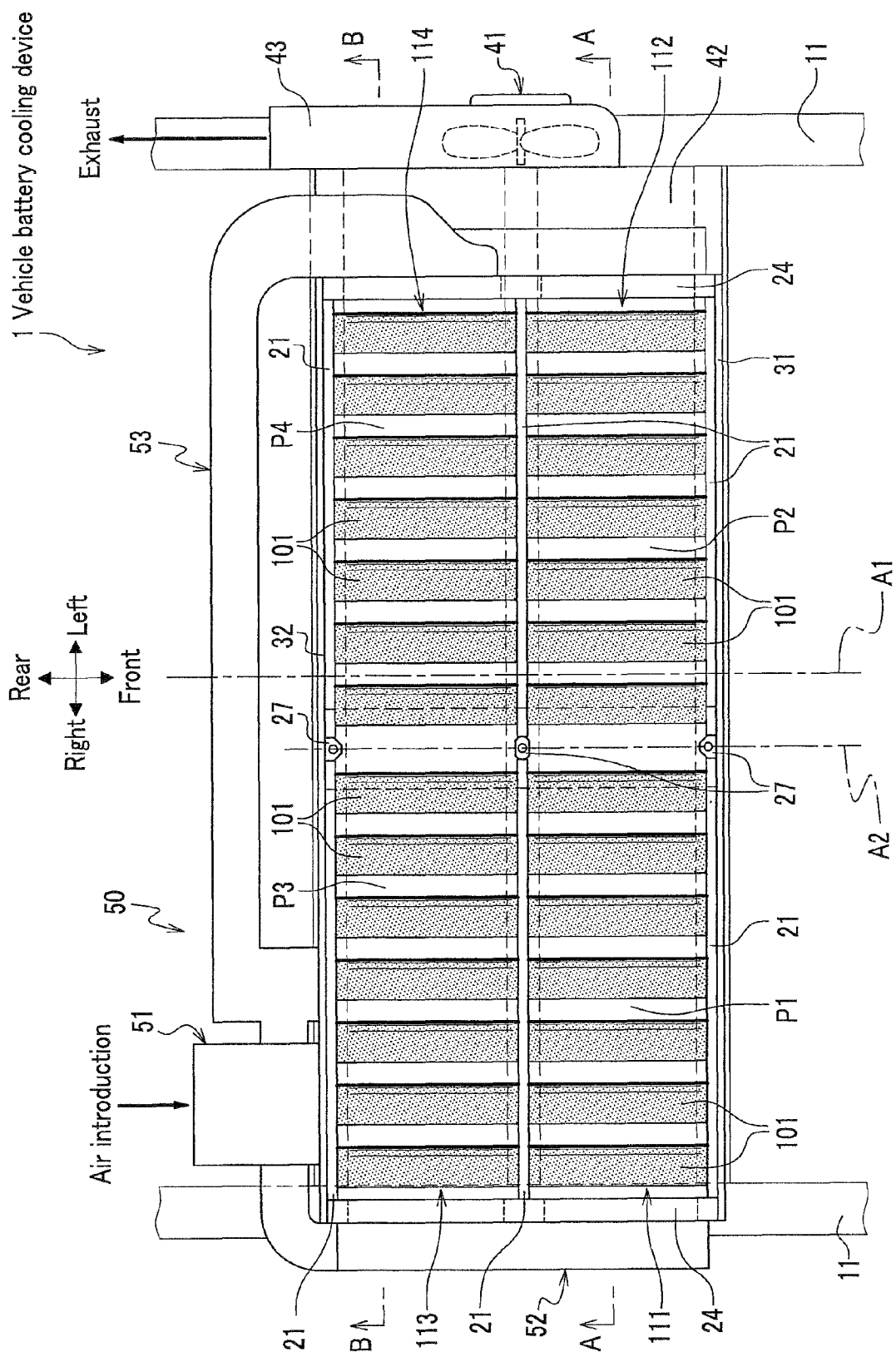
FIG. 8 is a plan view of a vehicle battery cooling device, whose upper panel is removed, according to the embodiment.
Figure 9:
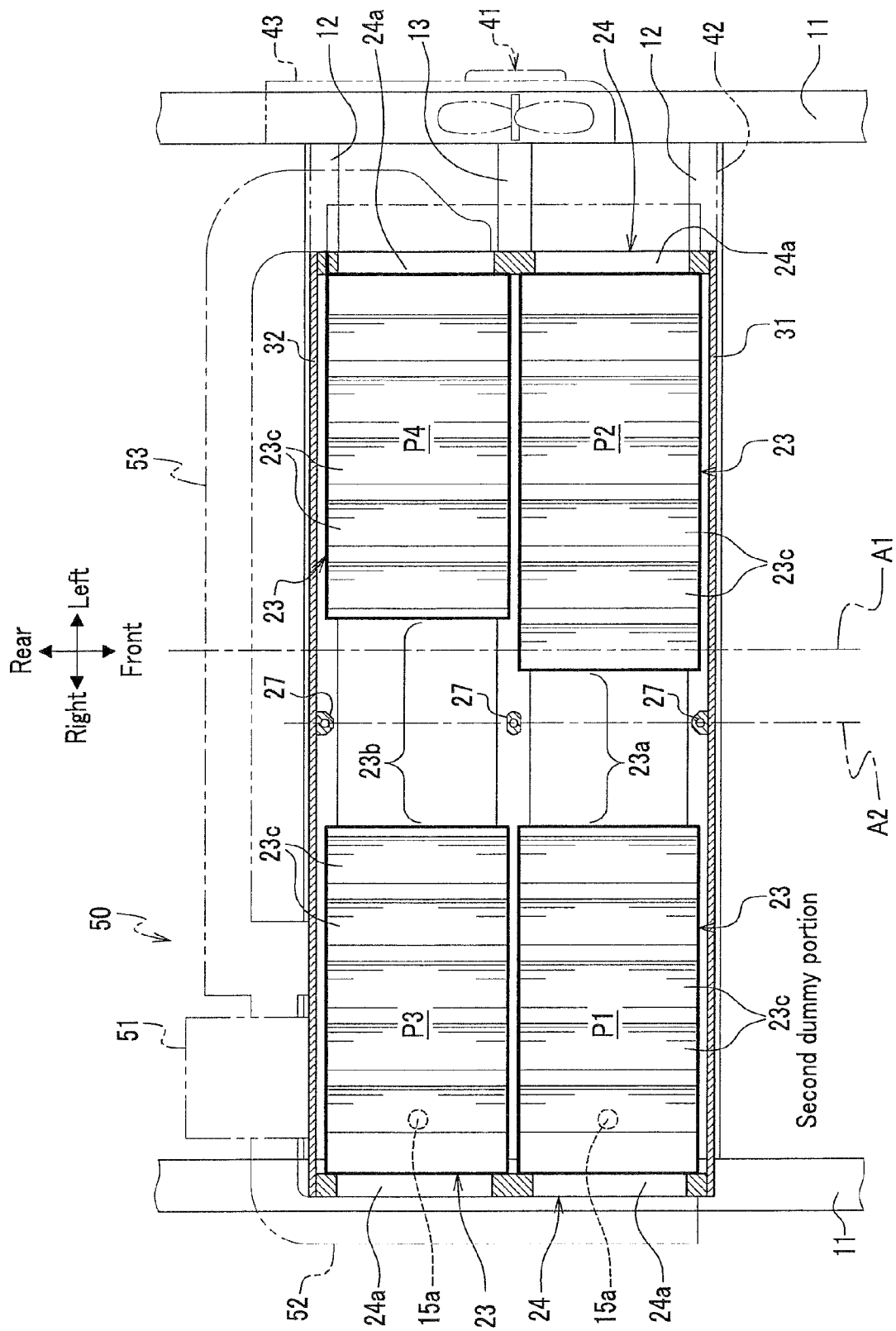
FIG. 9 is a top cross sectional view of a vehicle battery cooling device, whose upper panel and batteries are removed, according to the embodiment.

In addition, in the battery case 20, the first battery group 111 and the flow path P1 are arranged in right front, the second battery group 112 and the flow path P2 are arranged in left front, the third battery group 113 and the flow path p3 are arranged in right rear, and the fourth battery group 114 and the flow path P4 are arranged in left rear, respectively (see FIG. 8, FIG. 9).

The first battery group 111, second battery group 112, third battery group 113, and fourth battery group 114 are consist of twenty batteries 101, respectively. Each of the battery groups 111 to 114 includes a lower battery layer consist of seven batteries 101, a middle battery layer consist of six batteries 101, and an upper battery layer consist of seven batteries 101 (see FIG. 11, FIG. 12). In addition, in each of the battery groups 111 to 114, each of the batteries 101 is arranged at a predetermined interval in each layer and positioned alternately between the adjacent layers in plan view of the battery case.

That is, the each of the battery groups 111 to 114 has the same number of the batteries 101 and the same configuration.

In addition, the first battery group 111 and second battery group 112, as well as the third battery group 113 and fourth battery group 114 are arranged symmetrically on both sides (both sides of pillar member 27) of a center line A2 of the battery case 20, described later <<Constitution of Vehicle Battery Cooling Device>>

Figure 2:
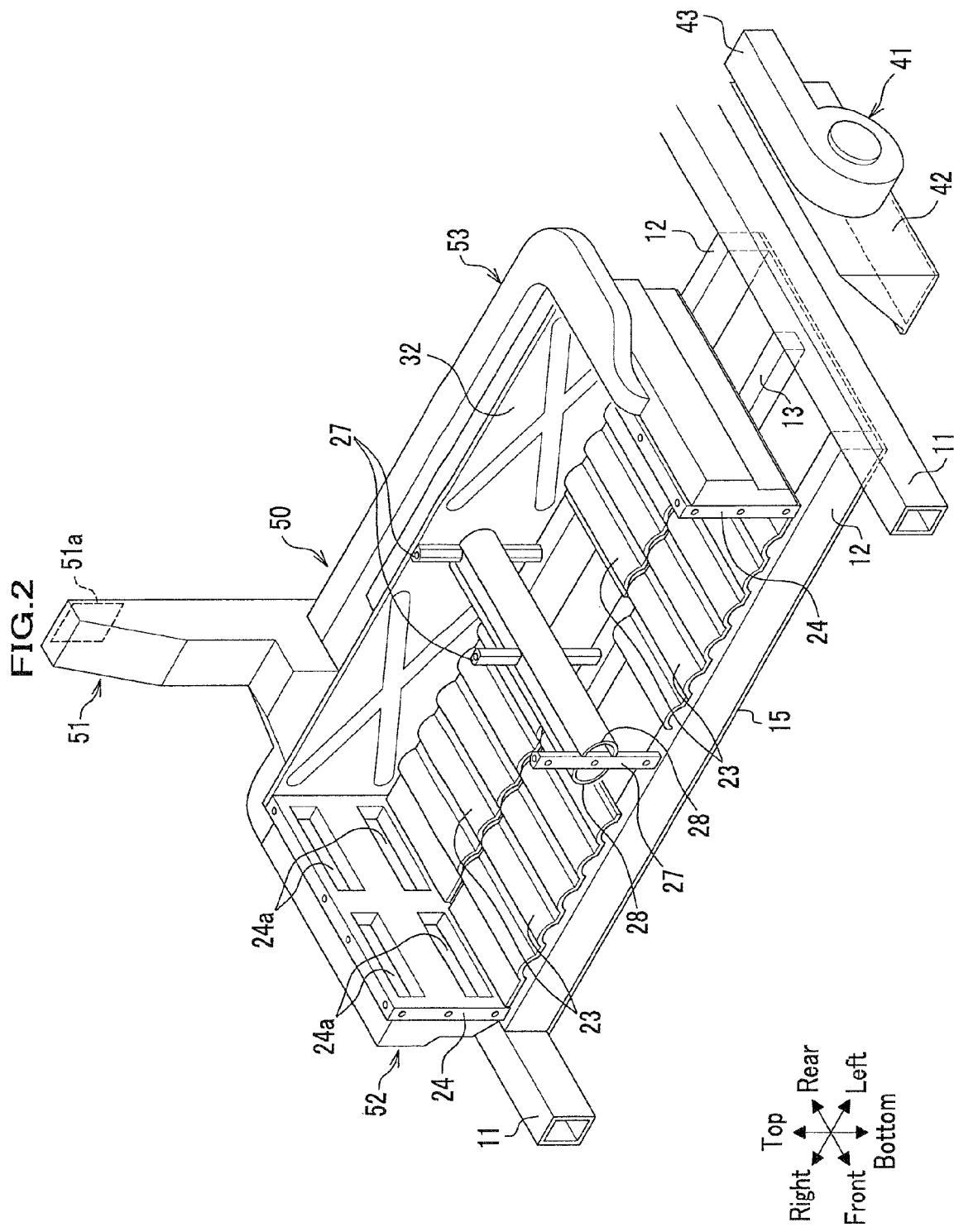
FIG. 2 is a partial exploded perspective view of a vehicle battery cooling device according to the embodiment.
Figure 3:
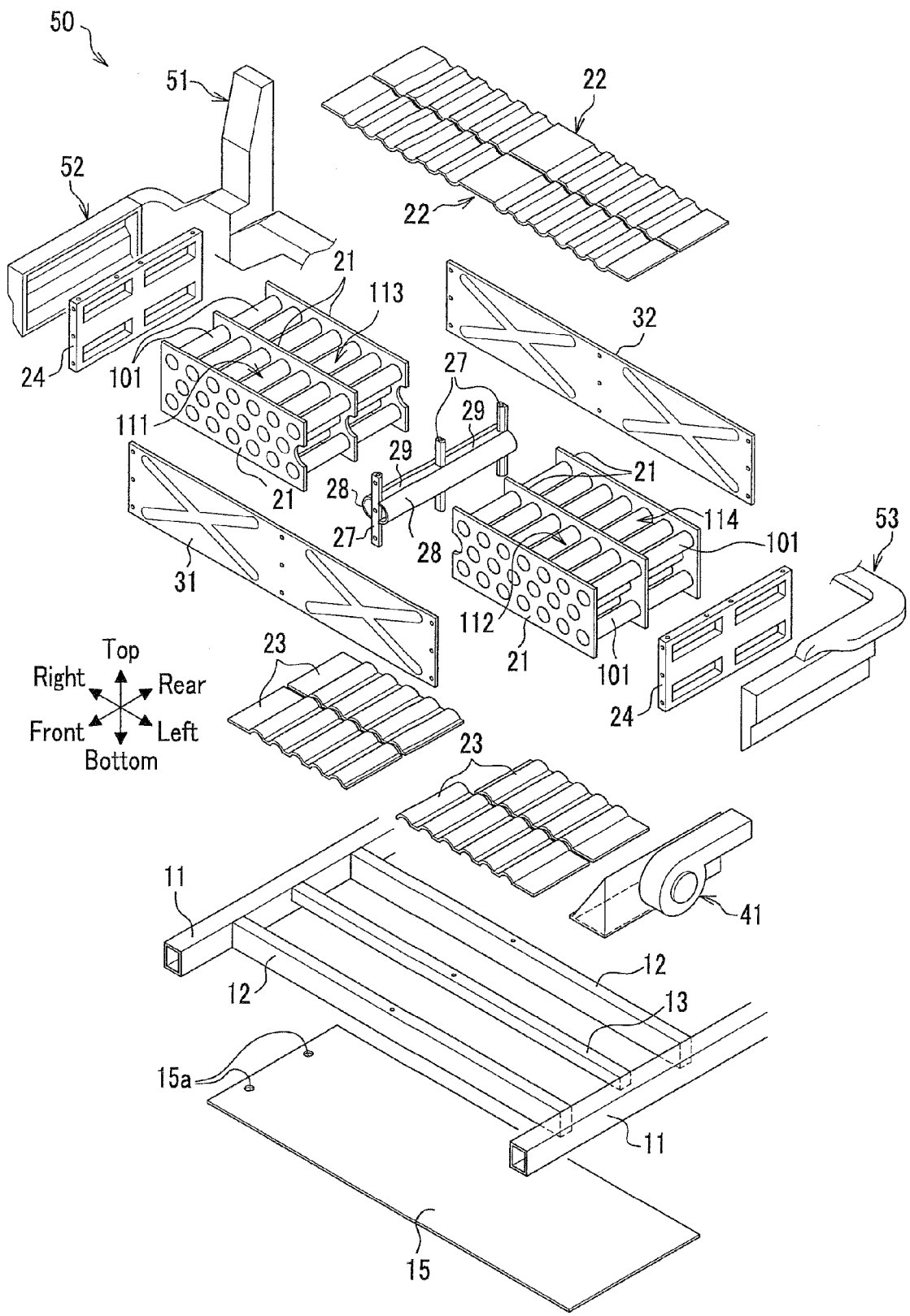
FIG. 3 is an exploded perspective view of a vehicle battery cooling device according to the embodiment.
Figure 4:
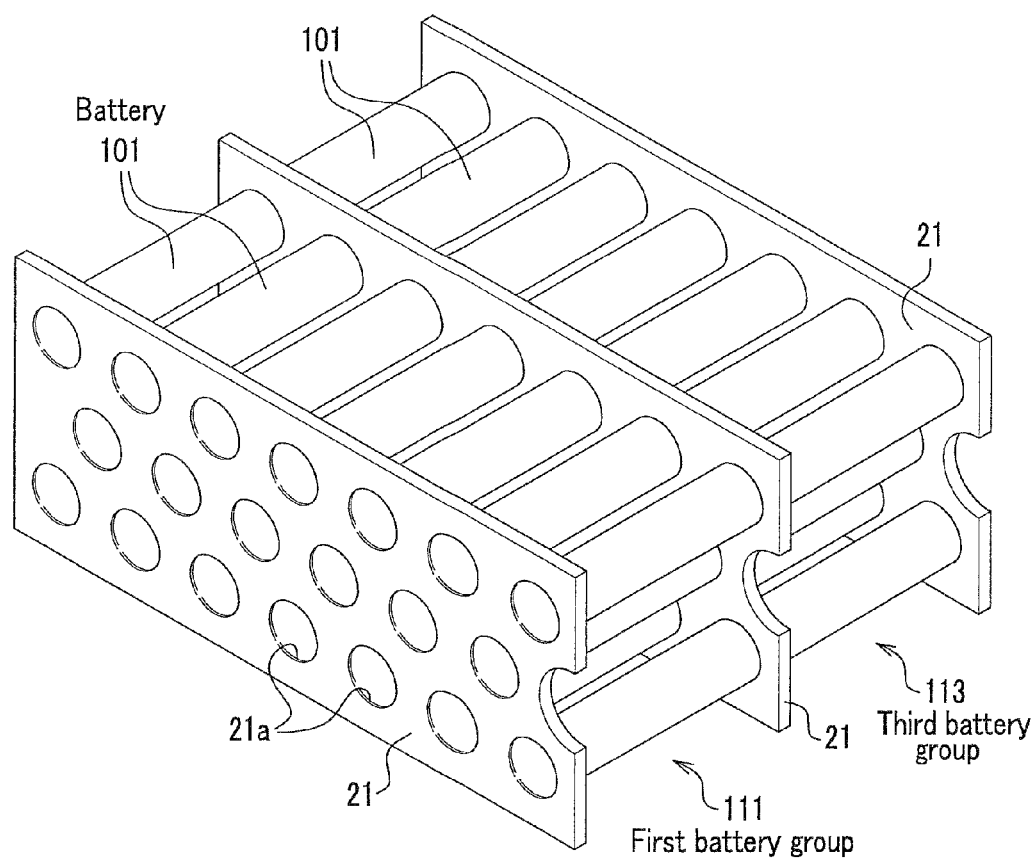
FIG. 4 is a perspective view of a plurality of batteries according to the embodiment.
Figure 16:
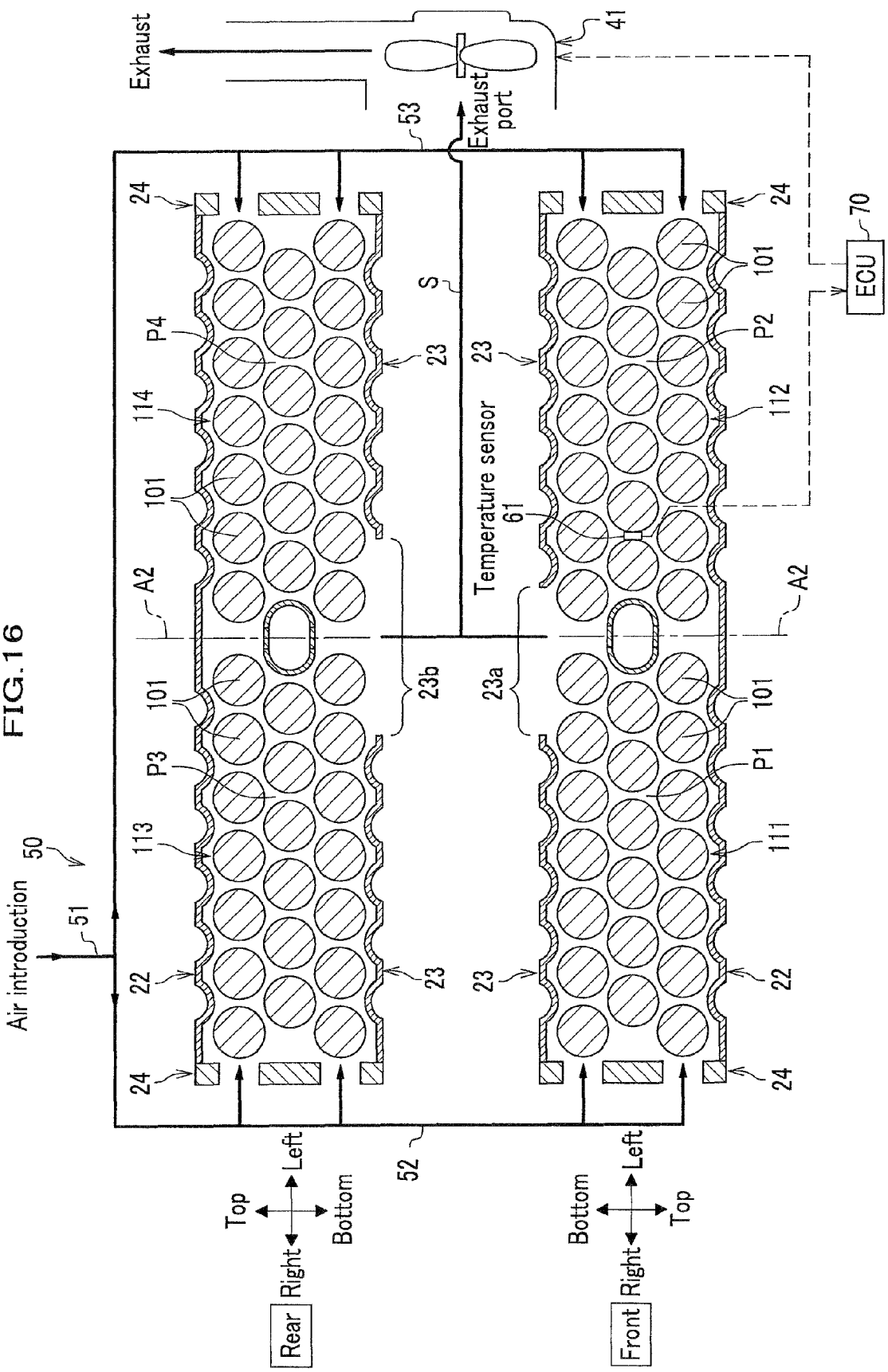
FIG. 16 is a schematic illustration of a constitution of a vehicle battery cooling device according to the embodiment.

As shown in FIG. 1 to FIG. 3, the vehicle battery cooling device 1 includes two front-rear frames 11 (first frame), two cross members 12 (second frame), the battery case 20, a fan 41, an air introduction duct 50, a temperature sensor 61 (see FIG. 16), and ECU 70 (Electronic Control Unit, see FIG. 16).

<Front-Rear Frame, Cross Member>

The two front-rear frames 11 and the two cross members 12 are members constituting a part of a vehicle body frame of the fuel cell electric vehicle. Each of the two front-rear frames 11 is disposed on each outer side of the vehicle in the vehicle width direction (see FIG. 2), and extending in a front-rear direction of the fuel cell electric vehicle. The two cross members 12 are disposed at a predetermined interval each other and extending in the vehicle width direction of the fuel cell electric vehicle, and both ends of the two cross members 12 are jointed to the two front-rear frames 11, 11, respectively (see FIG. 3).

Figure 10:
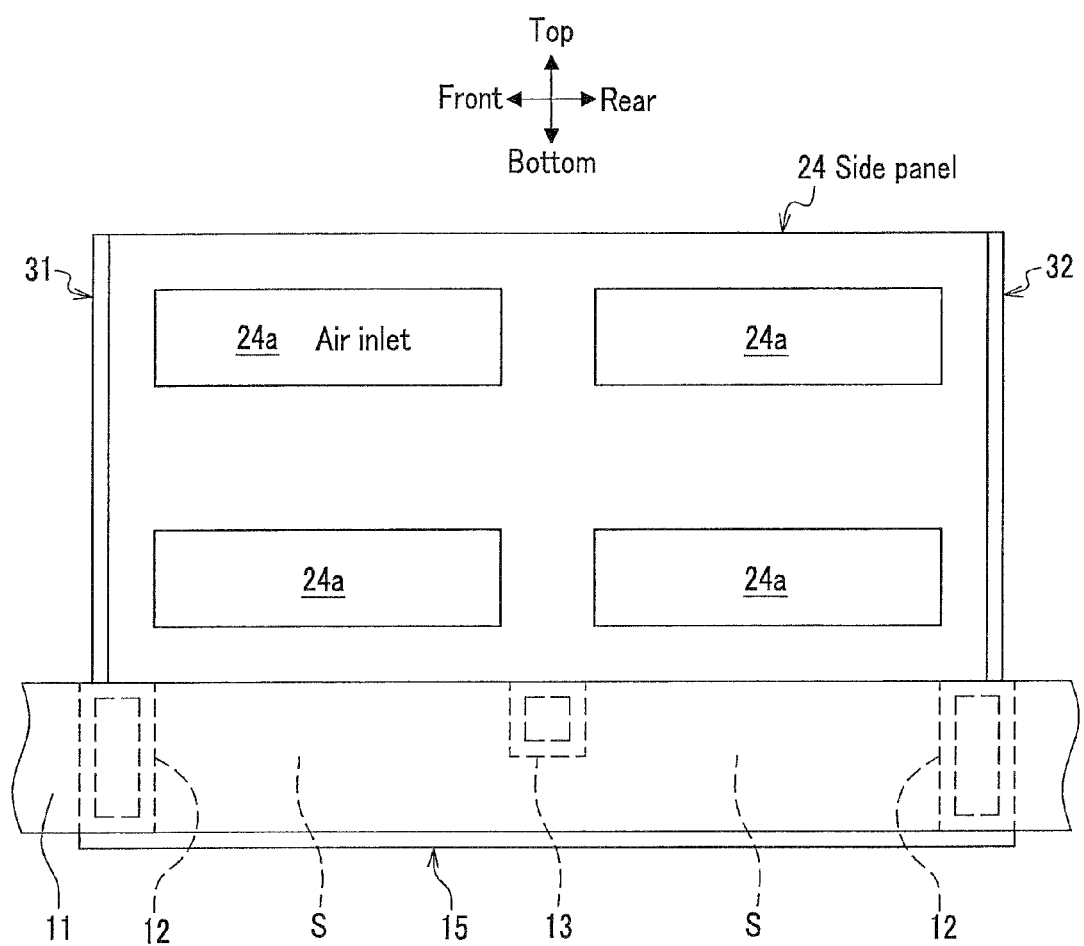
FIG. 10 is a left side view of a vehicle battery cooling device, whose fan and air introduction duct are removed, according to the embodiment.

A dimension of height of each of the front-rear frames 11 is designed substantially equal to that of each of the cross members 12 (see FIG. 10). A space S surrounded by the two front-rear frames 11, 11 and two cross members 12, 12 is formed, and the space S functions as a flow path of air exhausted from the battery case 20 (see FIG. 11, FIG. 12).

In addition, an intermediate member 13 (see FIG. 3, FIG. 9) is disposed at an intermediate position of the two facing cross members 12, 12, and jointed to the front-rear frames 11, 11.

<Lower Plate>

Figure 11:
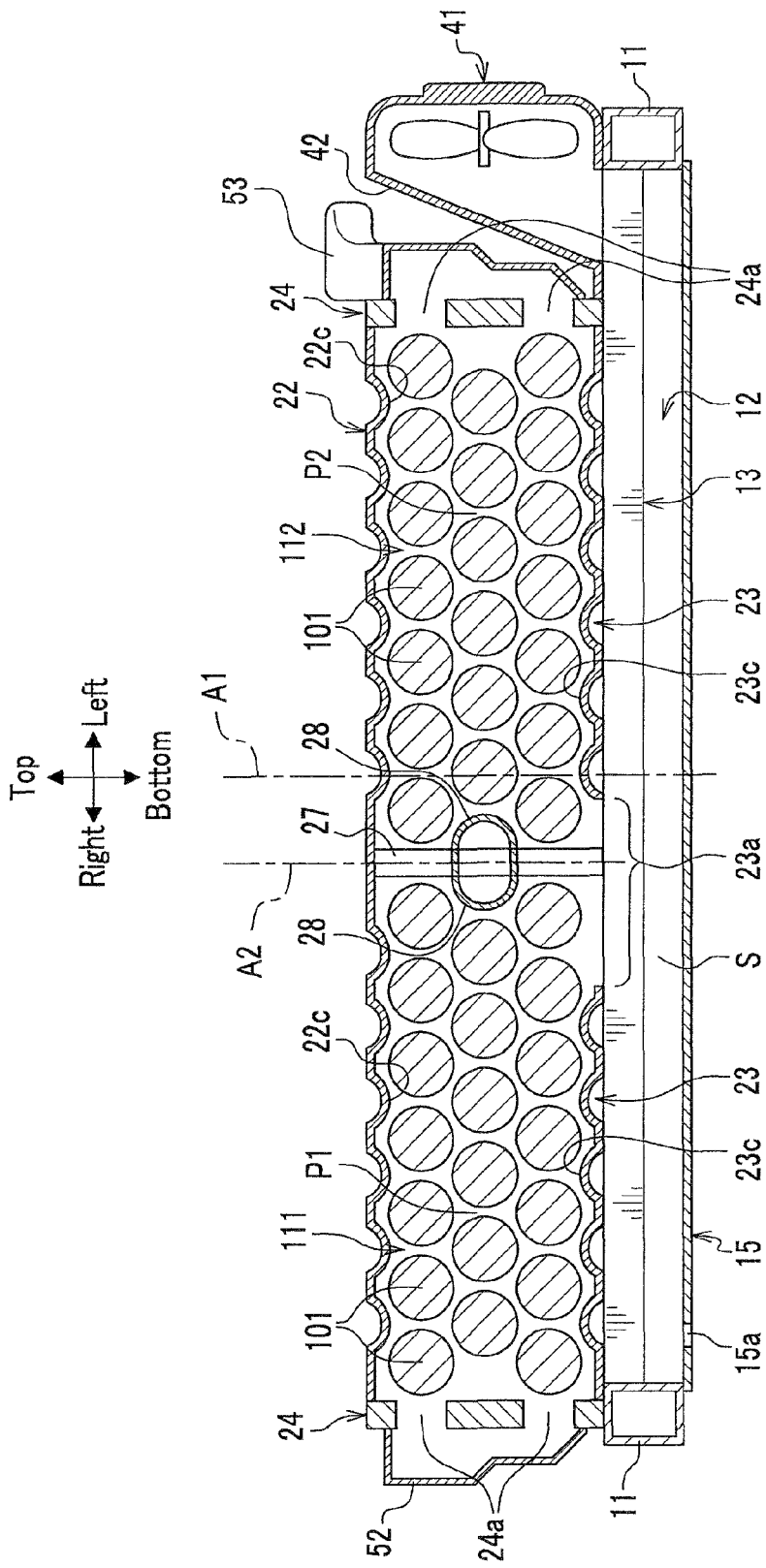
FIG. 11 is a cross sectional view taken along A-A line of FIG. 8.
Figure 12:
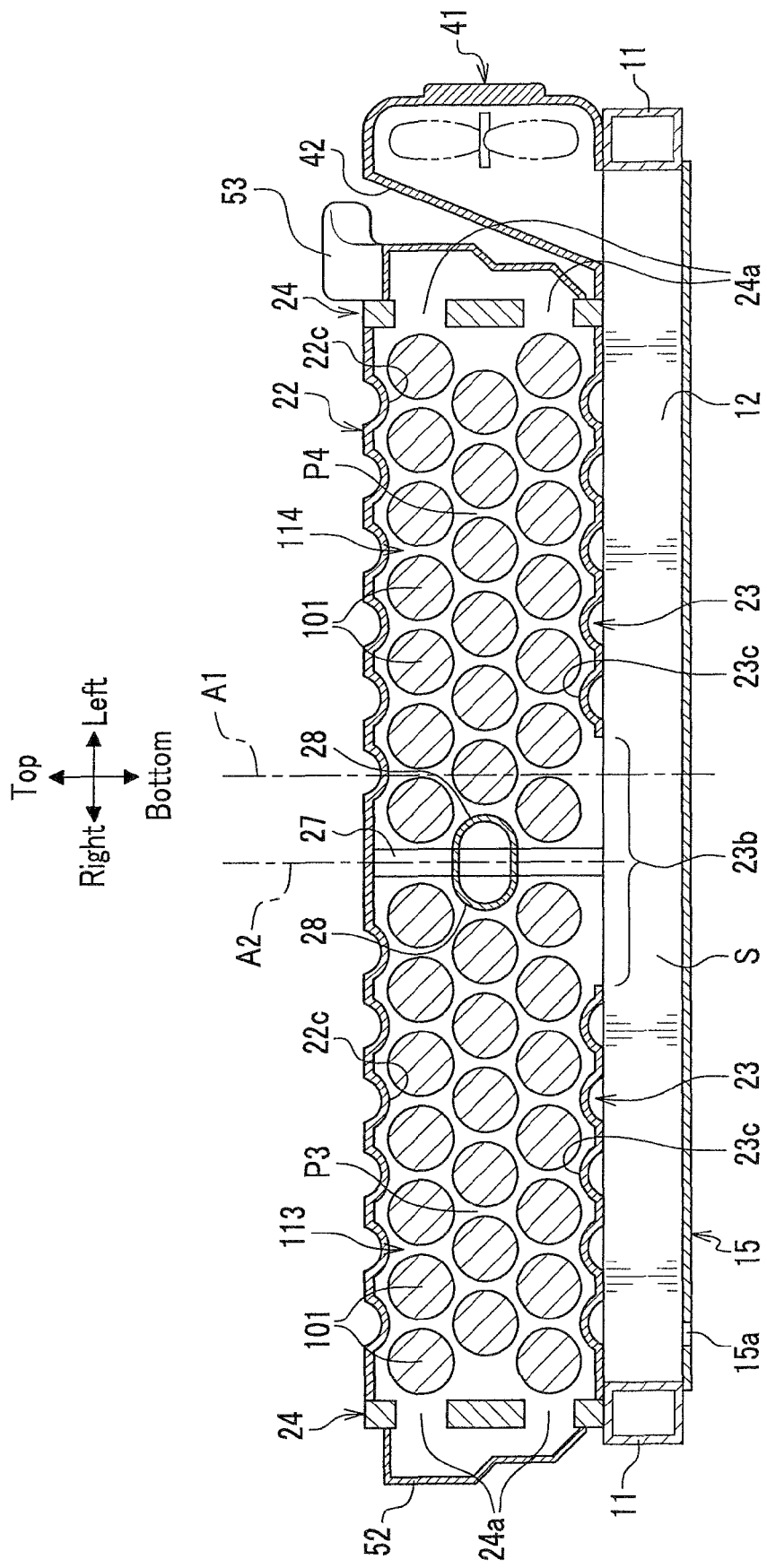
FIG. 12 is a cross sectional view taken along B-B line of FIG. 8.

A lower plate 15 is a plate component, and fitted on bottom surfaces of the two front-rear frames 11 and two cross members 12 to seal a lower side of the space S (see FIG. 10 to FIG. 12).

In the lower plate 15, two communication holes 15a are disposed (see FIG. 11, FIG. 12). The space S is communicated with the outside of the vehicle (outside) via the two communication holes 15a. With the communication holes 15a, for example, a dew drop can be exhausted outside the vehicle through the communication holes 15a, even if water such as the dew drop is produced in the space S.

In addition, the communication holes 15a, 15a are disposed on the right side in the vehicle width direction. That is, the communication holes 15a, 15a are disposed on an opposite side of the fan 41, which is disposed on the left side, across air outlets 23a, 23b through which air in the battery case 20 is exhausted (see FIG. 11, FIG. 12). Namely, the air outlet 23a (23b) and the communication hole 15a are disposed in this order from the fan 41. It is noted that the air outlets 23a, 23b are disposed substantially at the center of the battery case 20 in the vehicle width direction.

With this configuration, air outside the vehicle is hardly introduced in the space S via the communication holes 15a, 15a, and a cooling efficiency of the batteries 101 can be maintained, accordingly.

<Battery Case>

The battery case 20 is a container for housing the plurality of the batteries 101 for protecting the batteries 101 from, for example, water and dusts. The battery case 20 described above includes six holding panels 21, two upper panels 22, four bottom panels 23, two side panels 24, three pillar members 27, and two first dummy members 28 (see FIG. 1, FIG. 3).

The battery case 20 is arranged above the space S, which is surrounded by the front-rear frames 11, 11 and the cross members 12, 12, and shifted to the right side, that is, shifted to the front-rear frame 11 on the right side (see FIG. 11, FIG. 12). Namely, a center line A2 of the battery case 20 in the vehicle width direction is shifted to the right from a center line A1 of the fuel cell electric vehicle. The center line A1 passes between the two front-rear frames 11, 11.

In addition, a space is secured on the left side of the battery case 20 and substantially above a part of the space S, which is not occupied by the battery case 20. The fan 41 is disposed in the space (see FIG. 11, FIG. 12). As a result, the vehicle battery cooling device 1 with a small-footprint can be achieved.

[Pillar Member]

The three pillar members 27 are set up on the center line A2 (see FIG. 8) of the battery case 20, as well as on upper surfaces of the cross members 12, 12 and intermediate member 13 which are located in the vicinity of the air outlets 23a, 23b, described later (see FIG. 2, FIG. 9). An upper end of each pillar member 27 is fixed (see FIG. 11, FIG. 12) on the upper panel 22 by, for example, L-shaped bracket (not shown).

Here, in the embodiment, a bottom wall portion of the battery case 20 is provided with the two cross members 12 as well as the intermediate member 13 and the four bottom panels 23. In addition, an upper wall portion of the battery case 20 is provided with the two upper panels 22. The three pillar members 27 connect the upper wall portion and the bottom wall portion of the battery case 20, and maintain a given distance between the upper wall portion and the bottom wall portion, as well as increase a rigidity of the battery case 20.

[Holding Panel]

The six holding panels 21 are symmetrically disposed in the vehicle width direction on both sides of the three pillar members 27. In each holding panel 21, through-holes 21a are formed in such a manner that seven holes are in an upper layer, Six holes are in a middle layer, and seven holes are in a lower layer. The twenty through-holes in total are alternately disposed between the adjacent layers in the lateral direction (hereinafter, referred to as "zigzag pattern") as seen in the height direction (in plan view of the battery case). Each of the batteries 101 is inserted into each of the through-holes 21a.

With the configuration described above, the plurality of the batteries 101 are housed in the battery case 20 at a predetermined interval and layered in the zigzag pattern.

In addition, an air flow path in the battery case 20 is divided into the flow paths P1, P2 in the front side and flow paths P3, P4 in the rear side of the battery case 20 by the holding panels 21, 21 located in the intermediate of the front-rear direction of the battery case 20.

In addition, a front cover 31 is fitted on the holding panel 21 on the frontmost side (see FIG. 3, FIG. 8). On the other hand, a rear cover 32 is fitted on the holding panel 21 on the rearmost side.

[Bottom Panel]

The four bottom panels 23 are components constituting the bottom wall portion of the battery case 20, and fixed to the front-rear frames 11, cross members 12, and the intermediate member 13 (see FIG. 2, FIG. 9). Two bottom panels 23, 23 to be arranged in the vehicle width direction are distanced a predetermined interval each other, and a space formed between the two bottom panels 23, 23 is the air outlet 23a or air outlet 23b. That is, the front air outlet 23a and the rear air outlet 23b are formed (see FIG. 9) in the bottom wall portion of the battery case 20 composed of the four bottom panels 23 and the like.

It is noted that the bottom wall portion of the battery case 20 may be formed by one bottom panel.

The space S under the battery case 20 is communicated with the two flow paths P1, P2 in the front side of the battery case 20 via the front air outlet 23a (see FIG. 11), and with the two flow paths P3, P4 in the rear side of the battery case 20 via the rear air outlets 23b (see FIG. 12).

In addition, a size of the rear air outlet 23b is designed larger than that of the front air outlet 23a (see FIG. 9).

With the configuration described above, a resistance of a flow path, in which air exhausted from the front flow paths P1, P2 flows, becomes larger than that of the flow path in which air exhausted from the rear flow paths P3, P4 flows. That is, a pressure loss of the air exhausted from the front flow paths P1, P2 becomes larger than that of the air exhausted from the rear flow paths P3, P4.

Therefore, the batteries 101 arranged in the two front flow paths P1, P2 are poorly cooled compared with those arranged in the two rear flow paths P3, P4, thereby a temperature of the batteries 101 arranged in the two front flow paths P1, P2 becomes higher than that of the batteries 101 arranged in the two rear flow paths P3, P4.

[Bottom Panel-Second Dummy Portion]

In each bottom panel 23, a plurality of second dummy portions 23c which have a semicircular columnar shape protruding upward are formed (see FIG. 11, FIG. 12). The second dummy portions 23c are portions for forming a condition that the batteries 101 are virtually arranged below each of the battery groups 111 to 114, and a radius of the second dummy portion 23c having a semicircular columnar shape is formed substantially equal to that of the batteries 101, which have a circular columnar shape.

The second dummy portion 23c is disposed at a position corresponding to a space between the batteries 101, 101 adjacent to each other in the vehicle width direction in the lower layer of each of the battery groups 111 to 114. In addition, a distance between the second dummy portion 23c and the battery 101 is designed equal to that between the batteries 101 adjacent to each other.

Figure 14:
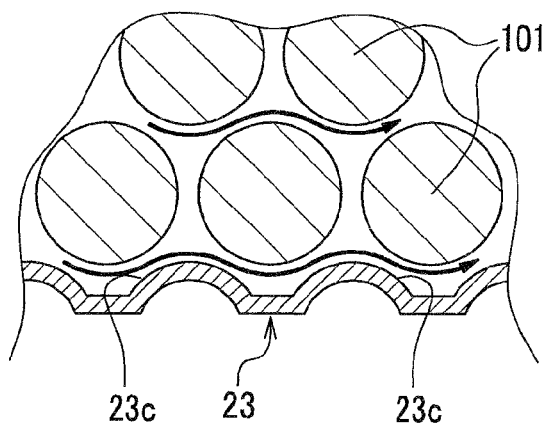
FIG. 14 is a cross sectional view of a main part of a vehicle battery cooling device according to the embodiment.

With the configuration described above, air flowing in the vicinity of the bottom panel 23 in the battery case 20 flows along outer periphery surfaces of the batteries 101 in the lower layer, and thereby preferably cools the batteries 101 (see FIG. 14).

[Side Panel]

Side panels 24, 24 are arranged facing each other in the vehicle width direction, and are components for forming a pair of side wall portions of the battery case 20 (see FIG. 8, FIG. 9). In each of the side panels 24, four air inlets 24a are disposed (see FIG. 10), and the two air inlets 24a of the four are disposed on the front side in the front-rear direction and the other two are disposed on the rear side.

In the front side of the battery case 20, air is introduced into each of the two front flow paths P1, P2 from the two air inlets 24a which are arranged in each front side of the pair of side panels 24 (see FIG. 9).

On the other hand, in the rear side of the battery case 20, air is introduced in each of the two rear flow paths P3, P4 from the four rear air inlets 24a which are arranged in each rear side of the pair of side panels 24 (see FIG. 9).

In addition, the air inlets 24a are disposed at positions corresponding to the heights of the batteries 101, which protrude toward the side panel 24 for each of the battery groups 111 to 114, of the lower layer and the upper layer (see FIG. 11, FIG. 12). Therefore, air from the air inlet 24a is introduced toward each of the centers of the protruding batteries 101 of the lower layer and the upper layer.

Figure 13:
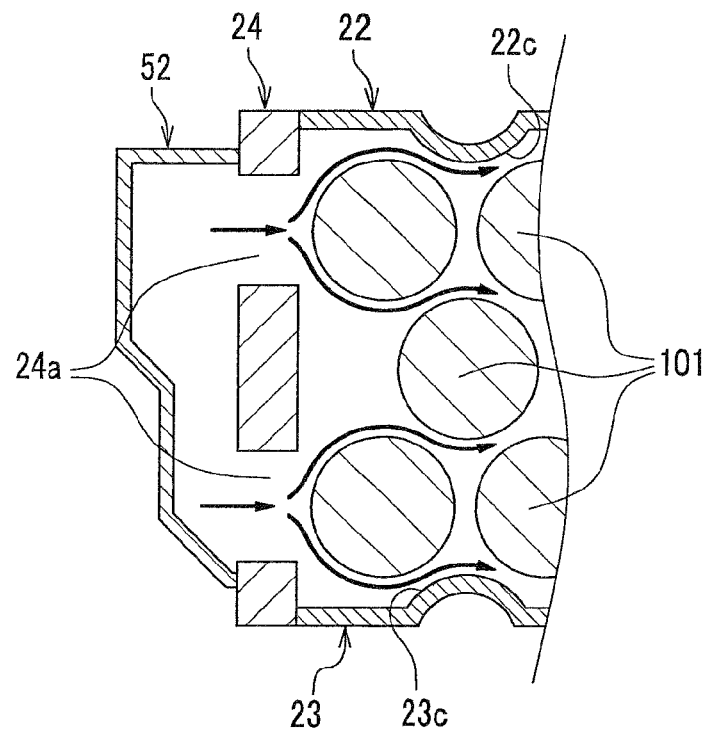
FIG. 13 is a cross sectional view of a main part of a vehicle battery cooling device according to the embodiment.

Accordingly, air flows along the outer periphery surfaces of the protruding batteries 101, thereby resulting in preferable cooling of the batteries 101 (see FIG. 13).

[Upper Panel]

The two upper panels 22 are components constituting an upper wall portion of the battery case 20, and fixed to the pillar members 27, holding panels 21, and side panels 24 to seal a space above the flow paths P1 to P4. An upper cover (not shown) is fixed to upper surfaces of the two upper panels 22.

It is noted that the upper wall portion of the battery case 20 may be formed with one upper panel.

[Upper Panel-Second Dummy Portion]

In each of the upper panels 22, a plurality of second dummy portions 22c which have a semicircular columnar shape protruding downward are formed (see FIG. 11, FIG. 12). The second dummy portions 22c are portions for forming a condition that the batteries 101 are virtually arranged above each of the battery groups 111 to 114, and a radius of the second dummy portion 22c having a semicircular columnar shape is formed substantially equal to that of the batteries 101, which have a circular columnar shape.

The second dummy portion 22c is arranged at a position corresponding to a space between the batteries 101, 101 adjacent to each other in the vehicle width direction in the upper layer of each of the battery groups 111 to 114 arranged in the vicinity of the upper panel 22. In addition, a distance between the second dummy portion 22c and the battery 101 is designed equal to that between the batteries 101 adjacent to each other.

With the configuration described above, air flowing in the vicinity of the upper panel 22 in the battery case 20 flows along outer periphery surfaces of the batteries 101 in the upper layer, and thereby preferably cools the batteries 101 (see FIG. 14).

[First Dummy Member]

Figure 5:
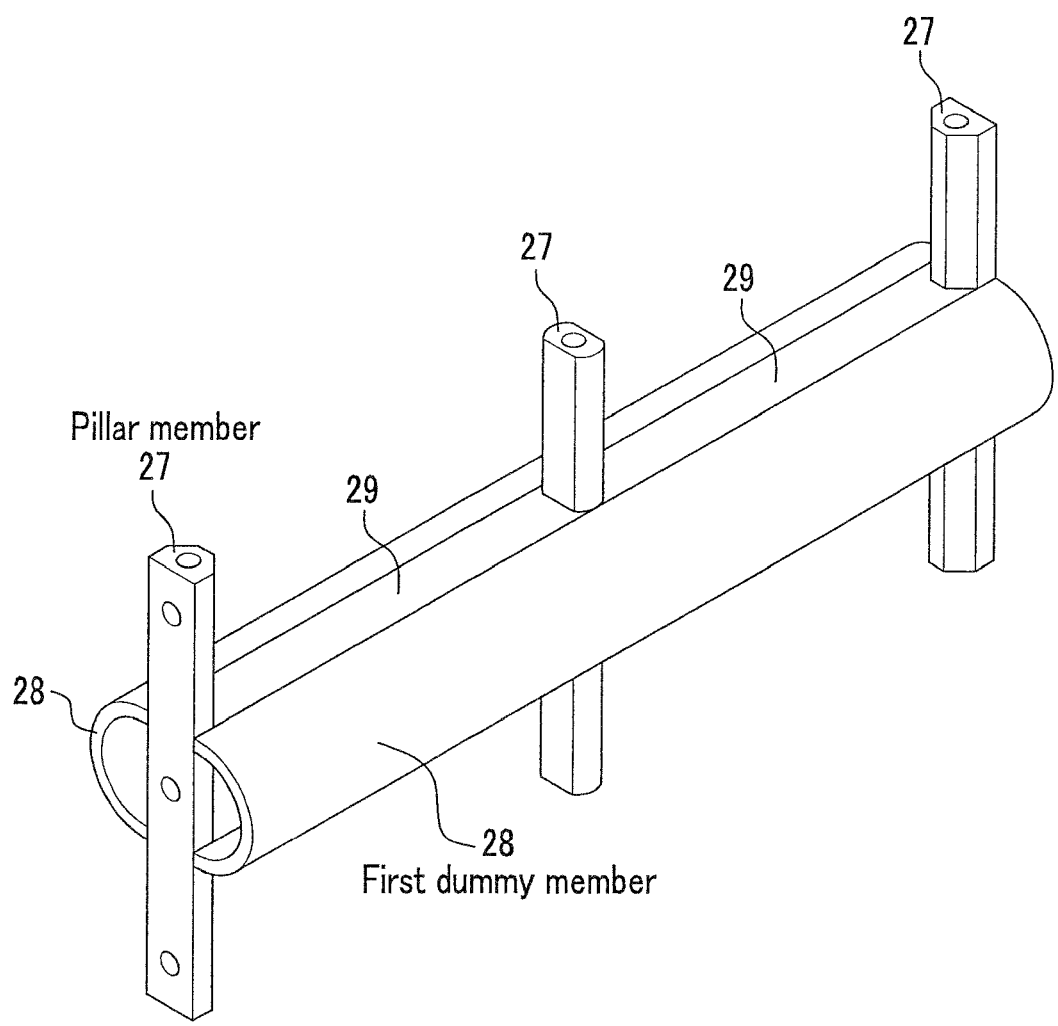
FIG. 5 is a perspective view of a pillar member and a first dummy member according to the embodiment.

As shown in FIG. 5, two first dummy members 28 are elongate components for forming a condition that the batteries 101 are virtually arranged on the side (side of air outlets 23a, 23b) of the pillar members 27 of each of the battery groups 111 to 114, and have a semicircular arc cross section and semicircular columnar outer shape. The two first dummy members 28 are fixed on both sides of the pillar members 27.

Figure 15:
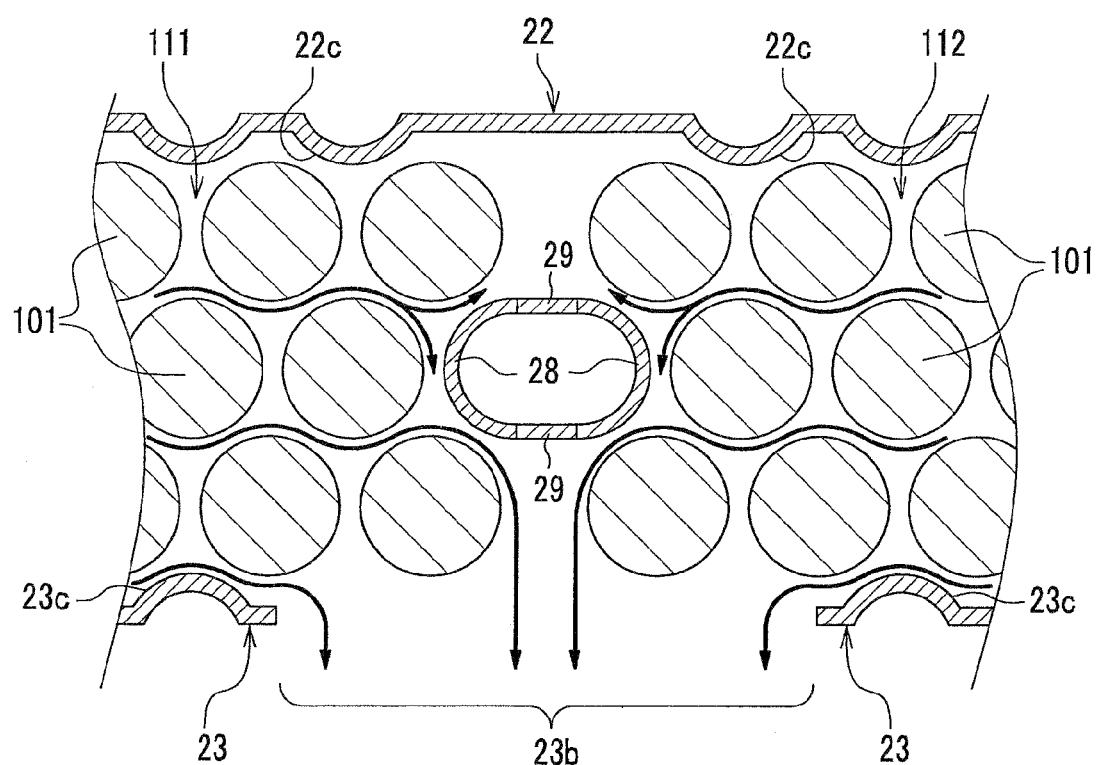
FIG. 15 is a cross sectional view of a main part of a vehicle battery cooling device according to the embodiment.

It is noted that a space between the first dummy members 28, 28 is occupied by four long parts 29 (see FIG. 5, FIG. 15).

The first dummy members 28 are arranged at positions corresponding to the heights of concave portions of the middle layer on the side (side of air outlets 23a, 23b) of the pillar members 27 with respect to each of the battery groups 111 to 114 (see FIG. 11, FIG. 12).

With the configuration described above, air is prevented from preferentially flowing into the elongate space formed in the concave portion, and the air forms a laminar flow. Therefore, the air flows along outer periphery surfaces of the batteries 101 of the lower layer and upper layer on the side of the pillar members 27, thereby resulting in effective cooling of the batteries 101 (see FIG. 15).

<Fan, Exhaust Duct>

The fan 41 is equipment for suctioning air in the space S and battery case 20 to generate a flow for cooling the batteries 101, and installed in the downstream of the battery case 20 in the embodiment. The fan 41 is installed in a space substantially above a part of the space S which is not occupied by the battery case 20 and fixed to the front-rear frame 11 on the left side of the vehicle (see FIG. 8).

In addition, two openings of the space S which are formed by shifting the battery case 20 to the right side and an air inlet port of the fan 41 are connected by a first exhaust duct 42 (see FIG. 8, FIG. 11, FIG. 12). In addition, a second exhaust duct 43 is connected to an air exhaust of the fan 41.

If the fan 41 is operated, air in the space S and air in the flow paths P1 to P4 are suctioned through the first exhaust duct 42. As a result, outside air is introduced into the flow paths P1 to P4 from both sides of the battery case 20 in the vehicle width direction through the air introduction duct 50. Therefore, many batteries 101 can be arranged in the vehicle width direction inside the battery case 20, while reducing a dimension of the battery case in height.

<Air Introduction Duct>

Figure 6:
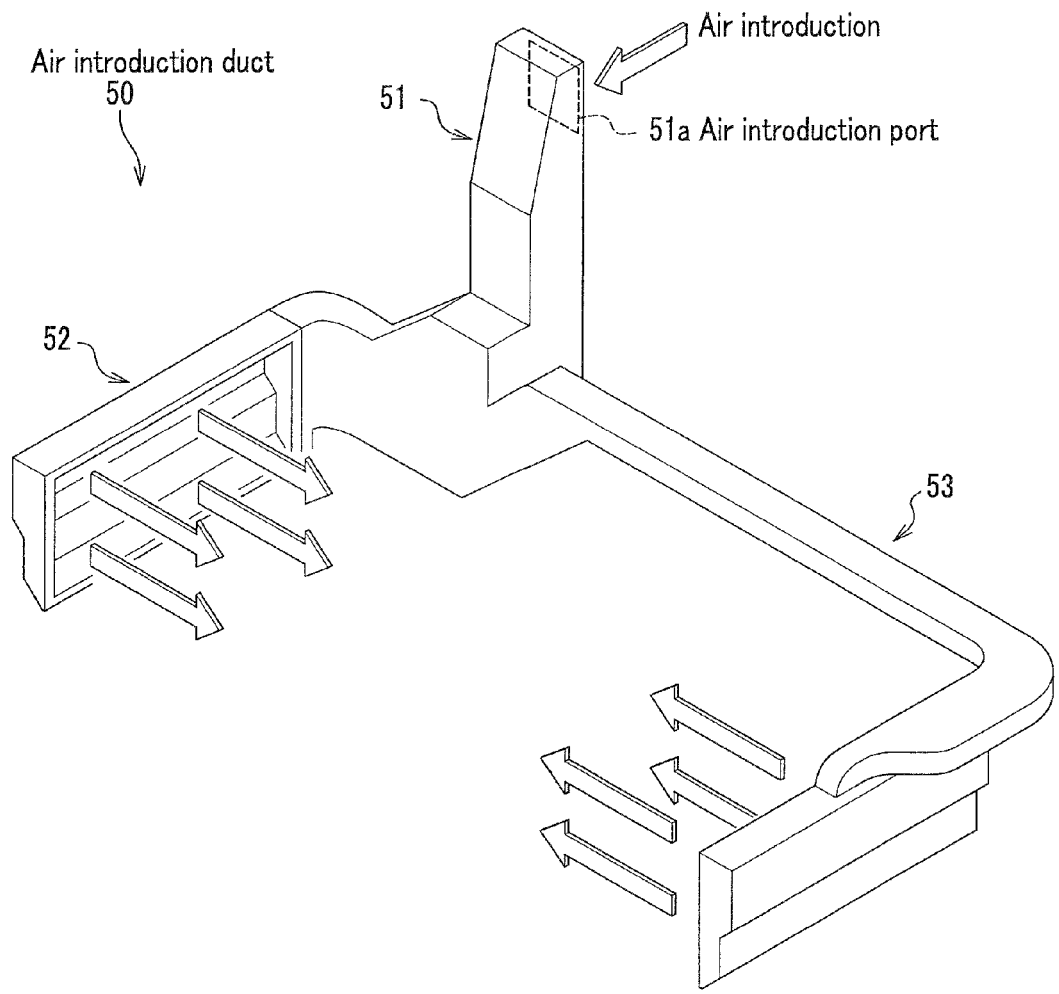
FIG. 6 is a perspective view of an air introduction duct according to the embodiment.
Figure 7:
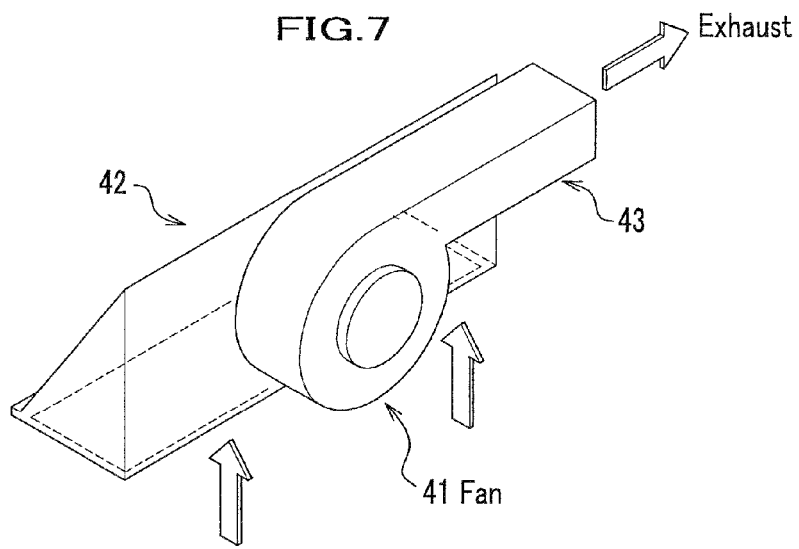
FIG. 7 is a perspective view of a fan and an air exhaust duct according to the embodiment.

The air introduction duct 50 is a duct for introducing outside air into the four flow paths P1 to P4, and as shown in FIG. 6, includes an air introduction portion 51 having an air introduction port 51a at the upstream end and a right branch portion 52 and left branch portion 53 which are branched into two in the downstream of the air introduction portion 51. The right branch portion 52 is arranged on the right side, and the downstream end thereof is connected to the four air inlets 24a formed on the side panel 24 on the right side. The left branch portion 53 is arranged on the left side, and the downstream end thereof is connected to the four air inlets 24a formed on the side panel 24 on the left side (see FIG. 8).

The air introduction port 51a is arranged so that the air introduction port 51a is distanced from an external heat source (for example, brake disc). That is, air is introduced from, for example, inside the trunk. Therefore, the air which is not heated up by the external heat source can be introduced into the battery case 20, thereby resulting in effective cooling of the batteries 101.

In addition, the left branch portion 53 is formed longer than the right branch portion 52 (see FIG. 8).

With the configuration described above, an air resistance of a flow path (left branch portion 53), in which air toward the two flow paths P2, P4 on the left side flows, becomes larger than that of the flow path (right branch portion 52) in which air toward the two flow paths P1, P3 on the right side flows. That is, a pressure loss of the air toward the two flow paths P2, P4 on the left side becomes larger than that of the air toward the two flow paths P1, P3 on the right side.

Therefore, air flowing into the two flow paths P2, P4 on the left side becomes harder than the air flowing into the two flow paths P1, P3 on the right side. As a result, cooling of the batteries 101 arranged in the two flow paths P2, P4 on the left side becomes poorer than the cooling of the batteries 101 arranged in the two flow paths P1, P3 on the right side. Accordingly, a temperate of the batteries 101 arranged in the two flow paths P2, P4 becomes higher than that of the batteries 101 arranged in the two flow paths P1, P3.

In addition, the right branch portion 52 and left branch portion 53 are formed so that the air inlets 24a, 24a on the front side are distanced from the air introduction port 51a compared with the air inlets 24a, 24a on the rear side (see FIG. 9).

With the configuration described above, the air flowing into the two flow paths P1, P2 on the front side becomes harder than the air flowing into the two flow paths P3, P4 on the rear side. Therefore, cooling of the batteries 101 arranged in the two flow paths P1, P2 on the front side becomes poorer than the cooling of the batteries 101 arranged in the two flow paths P3, P4 on the rear side. Accordingly, a temperate of the batteries 101 arranged in the two flow paths P1, P2 becomes higher than that of the batteries 101 arranged in the two flow paths P3, P4.

<Temperature Distribution of Batteries>

As a summary, in the upstream of the battery case 20, it is concluded that air taken into the battery case 20 from outside preferentially flows into each of the flow paths P1 to P4 as follows in descending order, that is, (1) flow path P3 in right rear, (2) flow path P1 in right front and flow path P4 in left rear, and (3) flow path P2 in left front.

On the other hand, in the downstream of the battery case 20, air in the flow paths P1, P2 on the front side is poorly exhausted compared with the air in the flow paths P3, P4 on the rear side.

Therefore, a largeness of flow rate of the air in the battery case 20 becomes as follows in descending order, that is, (1) flow path P3 in right rear, (2) flow path P1 in right front and flow path P4 in left rear, and (3) flow path P2 in left front, of the battery case 20.

Therefore, the batteries 101 arranged in the flow path P2 on the left front side is poorly cooled compared with those arranged in the other flow paths P1, P3, and P4, and thereby a temperature of the batteries 101 arranged in the flow path P2 tends to become higher than that of those arranged in the other flow paths P1, P3, and P4.

<Temperature Sensor>

A temperature sensor 61 is a sensor for detecting a temperature of the batteries 101. In the embodiment, the temperature sensor 61 is fixed on the battery 101 which is close to the air outlet 23b as described above and tends to become the highest temperature among the batteries 101 arranged in the flow path P2 on the left front side (see FIG. 16). Therefore, the temperature sensor 61 outputs a temperature of the battery 101 to be raised to the highest temperature to ECU 70.

<ECU>

The ECU 70 (control means) is a unit for electronically controlling the vehicle battery cooling device, and includes a CPU, ROM, RAM, various kinds of interfaces, and electronic circuits. The ECU 70 controls, for example, ON/OFF and a rotation speed of the fan 41 based on the temperature of the battery 101 detected by the temperature sensor 61.

Specifically, for example, the ECU 70 stores in advance a first predetermined temperature for switching ON the fan 41 and a second predetermined temperature, which is 2 to 5° C. lower than the first predetermined temperature, for switching OFF the fan 41. The ECU 70 controls ON/OFF of the fan 41 based on a current temperature of the battery 101, the first predetermined temperature, and the second predetermined temperature.

In addition, the control of the fan 41 may be designed such that in a temperature range that the fan 41 is to be switched ON, a rotation speed of the fan 41 becomes higher as the temperature of the battery 101 becomes higher.

<<Operations and Effects of Vehicle Battery Cooling Device>>

According to the vehicle battery cooling device 1 described above, the following effects can be obtained.

When the fan 41 is operated, air inside the battery case 20 is suctioned by the fan 41 (see FIG. 11, FIG. 12) through the air outlets 23a, 23b and space S in this order. That is, the space S, which is formed under the battery case 20 by being surrounded by the two front-rear frames 11 and two cross members 12 and sealed by the lower plate 15, can be utilized as an air exhaust flow path. With the configuration described above, a duct forming the air exhaust flow path is unnecessary, and thereby a number of components of the vehicle battery cooling device 1 can be reduced. Accordingly, the vehicle battery cooling device 1 can be simplified in structure and reduced in size and weight.

In addition, since the battery case 20 is located on the space S and shifted to the front-rear frame 11 on the right side, and since the fan 41 is arranged substantially above a part of the space S where the battery case 20 is not disposed, an outer shape of the vehicle battery cooling device 1 does not largely protrude outside the space S in plan view. Accordingly, the vehicle battery cooling device 1 can be designed compact.

In addition, for example, even if dew condensation water is produced in the battery case 20 and space S, the dew condensation water can be exhausted outside the vehicle through the communication holes 15a of the lower plate 15.

Further, since the communication holes 15a are disposed at positions opposite to the fan 41 across the air outlets 23a, 23b, a volume of air introduced through the communication holes 15a can be reduced even when the fan 41 is operated. As a result, a suctioning loss of the fan 41 can be reduced.

In addition, when the fan 41 is operated, air in the battery case 20 is suctioned and exhausted by the fan 41 through the air outlets 23a, 23b which are disposed on the bottom wall portion. Therefore, outside air is introduced into the battery case 20 through the air introduction duct 50 and air inlets 24a, which are disposed on the pair of the side panels 24 facing each other, and cools the batteries 101.

That is, since the fan 41 is arranged in the downstream of the air outlets 23a, 23b of the battery case 20, air which carries an operation heat of the fan 41 never introduced in the battery case 20, thereby resulting in effective cooling of the batteries 101. In addition, since the air is introduced into the battery case 20 through the air inlets 24a, 24a facing each other, the plurality of the batteries 101 can be effectively cooled.

In addition, even if the vehicle battery cooling device 1 is submerged and if water enters into the battery case 20 and the space S, the water rapidly can be exhausted by operating the fan 41 with normal rotation.

Further, since the air introduction port 51a of the air introduction duct 50 is disposed distant from other heat sources, air to be introduced into the battery case 20 is not heated up by the other heat sources, and as a result, the batteries 101 can be cooled effectively.

In addition, since the first dummy members 28, 28 are disposed on both sides of the pillar members 27 at the position corresponding to the concave portion of each of the battery groups 111 to 114, the air in the battery case 20 flows along the outer periphery surface of each of the batteries 101 on the air outlet side of each of the battery groups 111 to 114 (see FIG. 15). As a result, the pressure losses of the air in the upstream, downstream, and air outlet of each of the flow paths P1 to P4 can be made substantially uniform.

With the configuration described above, the batteries 101 arranged on the side of the air outlets 23a, 23b of each of the battery groups 111 to 114 can also be cooled effectively. As a result, the plurality of the batteries 101 can be uniformly cooled, thereby resulting in suppression of degrading variation between the plurality of the batteries 101.

In addition, since the air inlet 24a of the side panel 24 is disposed at the position corresponding to the protruding battery 101 toward the air inlet 24a, and thereby, the air from the air inlet 24a is introduced toward the center of the protruding battery 101 and flows along the outer periphery surface of the battery 101, the protruding battery 101 can also be cooled effectively (see FIG. 13).

Further, since the plurality of the second dummy portions 23c are disposed on the inner surface of the bottom panel 23, the air flows along the outer periphery surfaces of the batteries 101 of the lower layer to effectively cool the batteries 101 (see FIG. 14). Similar to the above, since the plurality of the second dummy portions 22c are disposed on the inner surface of the upper panel 22, the batteries 101 in the upper layer can be effectively cooled.

In addition, since the vehicle battery cooling device 1 is configured so that a temperature of the battery 101 constituting the second battery group 112 on the left front side becomes highest, a number of temperature sensors 61 for detecting the temperature of the battery 101 can be reduced.

In addition, since the ECU 70 controls the fan 41 based on only the temperature of the battery 101 detected by the temperature sensor 61, the plurality of the batteries 101 can be preferably cooled and can be prevented from degrading.

As described above, one embodiment of the present invention has been explained. However, the present invention is not limited to the embodiment and can be embodied in various forms without departing from the sprits of the invention, for example, as follows.

In the embodiment, the air in the battery case 20 is suctioned by the fan 41 through the space S. Other than this configuration, for example, the air in the battery case 20 may be suctioned by directly fixing the fan 41 to the air outlets 23a, 23b of the battery case 20.

In the embodiment, the lengths of the right branch portion 52 and left branch portion 53 of the air introduction duct 50 are different, and the flow rates of air to be introduced into the flow paths P2, P4 on the left side are made small. However, other than this method, for example, the left branch portion 53 may be partially narrowed or the air inlets 24a on the left side may be made small.

In addition, a shape (for example, length) of the air introduction duct 50 and a size of the air inlet 24a may be designed so that an equal quantity of air may be introduced into each of the flow paths P1 to P4 in the right and left, and front and rear of the battery case 20.

In addition to the embodiment described above, for example, a third dummy portion may be disposed on the inner surface of the side panel 24 corresponding to the concave portion in the middle layer of each of the battery groups 111 to 114 on the side of the panel 24.

In the embodiment described above, a configuration in which the fan 41 is disposed in the downstream of the battery case 20 has been exemplified. However, for example, the fan 41 may be disposed in the upstream of the battery case 20 so that air blown out from the fan 41 is introduced into the battery case 20.

What is claimed is:
1. A vehicle battery cooling device, comprising:
 a battery case for housing a plurality of batteries to be mounted on a vehicle;
 a fan for circulating air for cooling the batteries by drawing air through the battery case;
 an air inlet disposed on each of a pair of side wall portions of the battery case facing each other for introducing air from outside the battery case;
 an air outlet disposed on a bottom wall portion of the battery case for exhausting air from the battery case by being drawn by the fan;

two first frames extending in a front-rear direction of the vehicle and forming a part of a vehicle frame of the vehicle;

at least two second frames extending in a vehicle-width direction of the vehicle and forming a part of the vehicle frame of the vehicle, while being connected to the two first frames; and a lower plate for sealing a lower side of a space surrounded by the two first frames and the at least two second frames, wherein the battery case is disposed above the space, and air inside the battery case is drawn by the fan first through the air outlet and then through the space when the fan is operated.

2. The vehicle battery cooling device according to claim 1, further comprising:

an air introduction duct for introducing air from outside through one air introduction port and guiding the air to each of the air inlets by branching the air, wherein the one air introduction port is disposed distant from an external heat source.

3. The vehicle battery cooling device according to claim 1, further comprising:

a communication hole disposed in the lower plate for communicating between the space and outside, wherein the communication hole is disposed at a position opposite to the fan across the air outlet in the vehicle-width direction.

* * * * *